United States Patent
Ueda et al.

[11] Patent Number: 6,129,999
[45] Date of Patent: Oct. 10, 2000

[54] HIGH-STRENGTH WELDED STEEL STRUCTURES HAVING EXCELLENT CORROSION RESISTANCE

[75] Inventors: Masakatsu Ueda, Nara; Kazuhiro Ogawa, Nishinomiya; Kunio Kondo; Masaaki Igarashi, both of Sanda, all of Japan

[73] Assignee: Sumitomo Metal Industries, Ltd., Osaka, Japan

[21] Appl. No.: 09/043,649
[22] PCT Filed: Sep. 27, 1996
[86] PCT No.: PCT/JP96/02834
    § 371 Date: Mar. 25, 1998
    § 102(e) Date: Mar. 25, 1998
[87] PCT Pub. No.: WO97/12072
    PCT Pub. Date: Apr. 3, 1997

[30] Foreign Application Priority Data

Sep. 27, 1995 [JP] Japan .................................. 7-249661

[51] Int. Cl.⁷ .............................. B32B 15/18; F16L 9/02; F16L 9/22; B23K 101/04
[52] U.S. Cl. .......................... 428/683; 428/685; 138/142
[58] Field of Search .................... 928/683, 685; 138/142

[56] References Cited

U.S. PATENT DOCUMENTS

| | | | |
|---|---|---|---|
| 3,581,054 | 5/1971 | Bjorkroth | 219/146 |
| 3,700,851 | 10/1972 | Bjorkroth | 219/137 |
| 3,736,131 | 5/1973 | Espy | 75/126 B |
| 5,440,090 | 8/1995 | Davis et al. | 219/61 |
| 5,628,449 | 5/1997 | Onuma et al. | 228/262.41 |

FOREIGN PATENT DOCUMENTS

| | | |
|---|---|---|
| 61-113749 | 5/1986 | Japan . |
| 5-163553 | 6/1993 | Japan . |
| 5-287455 | 11/1993 | Japan . |
| 6-264192 | 9/1994 | Japan . |
| 60-165364 | 8/1995 | Japan . |
| 08057683 | 3/1996 | Japan . |
| 8-90281 | 4/1996 | Japan . |
| 8-132238 | 5/1996 | Japan . |

OTHER PUBLICATIONS

M. Ueda et al; Performance of High Corrosion Resistance Duplex Stainless Steel in Chloride and Sour Environments, Corrosion/93, Paper No. 125, NACE International, Houston (1993). No Month.

"Iron and Steel " 70(13) (1984), Yoritaka Ueda and four others, p. S1374. (No Month).

*Primary Examiner*—John J. Zimmerman
*Attorney, Agent, or Firm*—Armstrong, Westerman, Hattori, McLeland & Naughton

[57] ABSTRACT

Welded high-strength steel structure with excellent SSC and corrosion resistance in a wet carbon dioxide environment having a low $H_2S$ concentration. A structure having a Vickers hardness of at most 350 and a joint tensile strength of at least 620 MPa and composed of a base metal comprising a martensitic stainless steel with a martensitic or tempered martensitic structure containing 0.001 to 0.05% C and 9 to 14% Cr and a weld metal comprising an austenitic-ferritic stainless steel having a duplex structure composed of austenite and 35 to 75% by volume of ferrite and containing 22 to 27% Cr, 7 to 11% Ni and 1.5 to 5% Mo, and at most 0.03% C as an impurity.

4 Claims, 1 Drawing Sheet

HIGH-STRENGTH WELDED STEEL STRUCTURES HAVING EXCELLENT CORROSION RESISTANCE

TECHNICAL FIELD

The present invention relates to welded steel structures having excellent corrosion resistance in a wet carbon dioxide environment with a low $H_2S$ concentration saturated with hydrogen sulfide in a partial pressure of less than approximately 0.001 MPa (0.01 atm). Specifically, the invention relates to high-strength welded steel structures, such as desulfurizers for oil refineries, tanks, piping for geothermal plants, particularly oil or natural gas piping, in which both base metal and welded portion are insusceptible to sulfide stress cracking or corrosion damage even when used in the above environment.

BACKGROUND ART

A wet carbon dioxide environment having a low $H_2S$ concentration is frequently encountered by materials used in the fields of extraction, transport, refinement, storage, and the like of oil and natural gas, and is thus a significant environment for these fields of industry. The energy industry, the chemical synthesis industry, and the like which support modern society depend on crude oil, natural gas, and the like. Also, crude oil and natural gas are difficult to secure or utilize without materials that are resistant to the environment. Accordingly, it is not too much to say that materials resistant to the environment support modern society.

For welded steel structures used in the environment, most significant problems to solve are sulfide stress cracking (hereinafter referred to as SSC) in the heat affected zone (hereinafter referred to as HAZ) of a steel and corrosion resistance of a weld metal. SSC in HAZ refers to occurrence of SSC in HAZ hardened by welding. Herein, SSC refers to hydrogen-induced cracking, i.e. cracking induced by entry of hydrogen generated by a cathodic reaction into steel, and is distinguished from stress corrosion cracking (hereinafter referred to as SCC) accompanied by an anodic reaction accompanied with solution of electrode.

Corrosion of a weld metal refers to both "corrosion induced by trace hydrogen sulfide" contained in wet carbon dioxide gas and "corrosion induced by wet carbon dioxide gas". A type of corrosion corresponds to both general corrosion and pitting corrosion of a weld metal. Corrosion induced by hydrogen sulfide is called "hydrogen sulfide corrosion." Particularly, corrosion emerging in the form of cracking and accompanied by an anodic reaction making the electrode dissolve is called SCC.

As will be described later, welded steel structures, for example, welded piping, endurable of long-term use in the environment are so far limited to those manufactured of expensive materials. Accordingly, in the above-mentioned oil extraction and like industries there has been eager demand for inexpensive welded steel structures having SSC resistance and corrosion resistance.

As disclosed by the inventors of the present invention in Japanese Patent Application Laid-Open (kokai) No. 5-287455, low carbon stainless steel containing Mo and 13% Cr exhibits sufficient corrosion resistance in a wet carbon dioxide environment with a low $H_2S$ concentration and is used by many users as material for an oil well pipe. That is, the low carbon stainless steel containing Mo and 13% Cr raises no problem as material for an oil well pipe unless welding is involved.

However, when a welded steel structure composed of the low carbon stainless steel containing Mo and 13% Cr serving as a base metal and a steel having the same chemical composition as that of the base metal serving as a welding material is used in a wet carbon dioxide environment with a low $H_2S$ concentration, SSC occurs in HAZ, and a weld metal exhibits a relatively high corrosion rate. Thus, the welded steel structure fails to endure the use in the environment.

By contrast, a welded steel structure employing Cr-concentration-increased duplex stainless steel containing 22% Cr as both a base metal and a weld metal exhibits excellent SSC resistance and corrosion resistance in the aforementioned environment (M. Ueda et al; "Performance of high corrosion resistant duplex stainless steel in chloride and sour environments, Corrosion/93, Paper No. 125, NACE International, Houston (1993)).

Accordingly, in a wet carbon dioxide environment with a low $H_2S$ concentration there is used a welded steel structure composed of a base metal formed from duplex stainless steel containing 22% Cr and a weld metal formed from duplex stainless steel containing 22% Cr. Particularly, welded piping using seamless pipe as a base metal is used in such an environment.

However, duplex stainless steel containing 22% Cr is more expensive and lower in strength than is stainless steel containing 13% Cr.

DISCLOSURE OF THE INVENTION

An object of the present invention is to provide an inexpensive welded high-strength steel structure, particularly, welded piping, usable in a wet carbon dioxide environment with a low $H_2S$ concentration, as welded or after being subjected to post weld heat treatment (hereinafter referred to as PWHT), and specifically to provide a welded steel structure having the following performance. Base Metal (including HAZ):

(1) SSC does not occur in a wet carbon dioxide environment having a low $H_2S$ concentration.
(2) Excellent corrosion resistance is exhibited in a wet carbon dioxide environment having a low $H_2S$ concentration.
(3) Strength is higher than that of the conventional duplex stainless steel containing 22% Cr (UNS (Unified Numbering System for Metals and Alloys) S31803) and is not lower than X80 as defined by the API (American Petroleum Institute) Standard.
(4) Cost is lower than that of the conventional duplex stainless steel. Weld Metal:
(1) Excellent corrosion resistance is exhibited in a wet carbon dioxide environment having a low $H_2S$ concentration.
(2) Strength is higher than that of a weld metal formed from the conventional duplex stainless steel containing 22% Cr (UNS S31803) and is not lower than X80 as defined by the API Standard. Welded Steel Structure:
(1) Rupture does not occur in a weld metal in a tensile test of a welded joint, and a tensile strength (TS) of not less than 620 MPa is provided. 620 MPa is the lower limit of the nominal tensile strength of an X80 grade steel according to the API Standard.

As compared with a conventional technical idea, the basic idea of the present invention is novel in that a welded steel structure exhibiting all the above performance characteristics is composed of a base metal formed from stainless steel containing 13% Cr and a weld metal formed from duplex stainless steel containing 25% Cr.

The gist of the present invention resides in providing a welded steel structure whose base metal chemical composition and microstructure, whose weld metal chemical composition and microstructure, hardness, and welded joint tensile strength are limited to the corresponding ranges described below.

(1) A welded high-strength steel structure having excellent corrosion resistance in a wet carbon dioxide environment having a low $H_2S$ concentration, comprising a base metal described below in (a) and a weld metal described below in (b) and having a Vickers hardness of not greater than 350 and a welded joint tensile strength of not less than 620 MPa (first embodiment).

(a) A martensitic stainless steel whose chemical composition includes, on a weight basis, 0.001% to 0.05% C and 9% to 14% Cr and whose microstructure is of the martensitic phase or tempered martensitic phase.

(b) An austenitic-ferritic stainless steel whose chemical composition includes, on a weight basis, 22% to 27% Cr, 7% to 11% Ni, 1.5% to 5% Mo, and not greater than 0.03% C as an unavoidable impurity and whose microstructure is a duplex structure composed of the austenitic phase and 35% to 75% by volume of the ferritic phase.

(2) A welded steel structure as described above in the first embodiment, wherein the chemical composition of a base metal is described below in (c), and the chemical composition of a weld metal is described below in (d) (second embodiment).

(c) A chemical composition based on % by weight: C: 0.001% to 0.05%; Si: not greater than 1%; Mn: not greater than 5%; Cr: 9% to 14%; Ni: 0.5% to 7%; sol. Al: 0.001% to 0.2%; Mo: 0% to 4%; Cu: 0% to 3%; W: 0% to 5%; Ti: 0% to 0.2%; Nb: 0% to 0.2%; Zr: 0% to 0.2%; Ca: 0% to 0.01%; B: 0% to 0.01%; and the balance: Fe and unavoidable impurities including not greater than 0.03% P and not greater than 0.01% S.

(d) A chemical composition based on % by weight: Si: not greater than 1%; Mn: not greater than 2%; Cr: 22% to 27%; Ni: 7% to 11%; Mo: 1.5% to 5%; sol. Al: 0.005% to 0.1%; N: 0.05% to 0.4%; Cu: 0% to 2%; W: 0% to 3.5%; Ti: 0% to 0.15%; Nb: 0% to 0.15%; Zr: 0% to 0.15%; Ca: 0% to 0.01%; B: 0% to 0.01%; and the balance: Fe and unavoidable impurities including not greater than 0.03% C, not greater than 0.02% P, and not greater than 0.01% S.

(3) A welded steel structure as described above in the second embodiment, wherein the chemical composition of a weld metal contains Mn, Cu, and W in an amount described below in (e) (third embodiment).

(e) Mn: not greater than 1.5%; Cu: 0.3% to 2%; and W: 1.5% to 3.5%.

(4) A welded steel structure as described above in the second embodiment, wherein the chemical composition of a base metal contains C, Mn, Cr, Ni, Mo, Ti, Cu, W, Nb, and Zr in an amount described below in (f), and the chemical composition of a weld metal contains Mo, Cu, W, Nb, and Zr in an amount described below in (g) (fourth embodiment).

(f) C: 0.001% to 0.01%; Mn: not greater than 0.5%; Cr: 11% to 14%; Ni: 4.5% to 7%; Mo: 1.5% to 4%; Ti: 0.01% to 0.2%; and Cu, W, Nb, and Zr are intentionally not added.

(g) Mo: 2.5% to 5%; and Cu, W, Nb, and Zr are intentionally not added.

(5) A welded steel structure as described above in the second invention, wherein the chemical composition of a base metal contains C, Mn, Cr, Ni; Mo, Ti, Cu, W, Nb, and Zr in an amount described below in (f), and the chemical composition of a weld metal contains Mn, Cu, W, Nb, and Zr in an amount described below in (h) (fifth invention).

(f) C: 0.001% to 0.01%; Mn: not greater than 0.5%; Cr: 11% to 14%; Ni: 4.5% to 7%; Mo: 1.5% to 4%; Ti: 0.01% to 0.2%; and Cu, W, Nb, and Zr are intentionally not added.

(h) Mn: not greater than 1.5%; Cu: 0.3% to 2%; W: 1.5% to 3.5%; and Nb and Zr are intentionally not added.

In the description above, a welded steel structure refers to all kinds of the steel structure constructed by welding, for example, welded piping.

Herein, welded piping refers to a circumferentially welded steel pipe to be incorporated into a structure as part of the structure. Welded piping or the like may be used as circumferentially welded or after being subjected to PWHT.

Figure 1A:
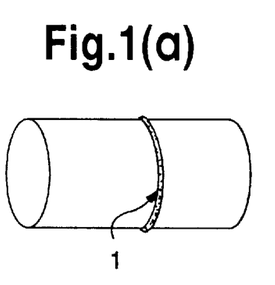
Figure 1B:
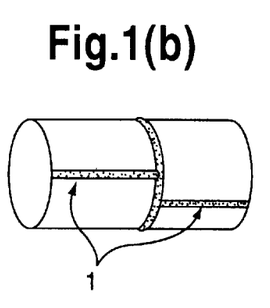
Figure 1C:
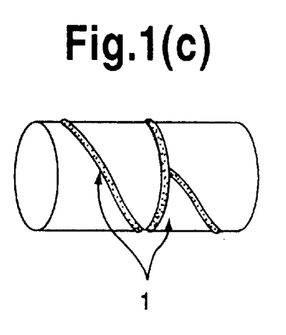

FIG. 1 is a schematic view showing the circumferentially welded state of various kinds of steel pipes, wherein (a) shows the minimum unit of piping obtained by circumferentially welding seamless steel pipes, (b) shows that of piping obtained by circumferentially welding steel pipes, each manufactured by longitudinally seam-welding a steel plate, and (c) shows that of piping obtained by circumferentially welding steel pipes, each manufactured by spirally welding a hot coil.

That is, the above-mentioned steel pipe refers to a steel pipe serving as a material. A steel pipe serving as a material is not limited to a seamless steel pipe, but also refers to a steel pipe manufactured by welding a steel plate or a hot coil. Herein, when a steel pipe serving as a component material of a welded steel structure includes a welded portion, the steel pipe is also considered a welded steel structure. That is, the steel plate or hot coil corresponds to a base metal as mentioned in the present invention, and a welded portion corresponds to a weld metal as mentioned in the present invention. Accordingly, a welded portion present in a steel pipe serving as a material is essentially identical to a welded portion formed by circumferential welding to be conducted when the steel pipe is incorporated into a structure. Thus, the weld metal of a longitudinally seam-welded portion or spirally welded portion must have a chemical composition conforming to the content ranges as specified in the present invention. Further, the entire steel pipe including a weld metal and HAZ which serves as a material must have a Vickers hardness of not greater than 350 as in the case of a circumferentially welded portion.

Vickers hardness is a hardness as measured under a test load of 1 kg (HV1).

Herein, the phrase "the tensile strength of a welded joint of a welded steel structure satisfies a certain stress value" means that rupture occurs in a base metal, not in a weld metal, in a tensile test of a welded joint, and a tensile strength as measured upon the occurrence of rupture satisfies the given stress value.

A wet carbon dioxide environment having a low $H_2S$ concentration corresponds to, for example, 5% NaCl solution saturated with $H_2S$ of a partial pressure of 0.01 atm and $CO_2$ of a partial pressure of 30 atm.

Next, features of a welded steel structure of the present invention will be described.

The inventors of the present invention studied various kinds of stainless steel containing 13% Cr for SSC of HAZ and studied various kinds of high-Cr-content weld metal for a corrosion phenomenon, in an artificially adjusted wet carbon dioxide environment having a low $H_2S$ concentration. As a result, there were obtained the following five technical points for a welded steel structure of the present invention.

(1) In order to secure a certain strength of a base metal, the microstructure of a base metal must be of a single phase of martensite or tempered martensite.

(2) In order to impart sufficient SSC resistance to a base metal, particularly to HAZ, in the above-mentioned environment, strength must be increased through increasing the content of an alloy element other than C and decreasing the C content accordingly, and the hardness of HAZ must be limited to a Vickers hardness of not greater than 350. In addition to adjustment of the content of an alloy element relating to strength, the Cr content must be adjusted to the range of 9% to 14% in order to secure corrosion resistance of a base metal in the above-mentioned environment.

(3) In order to exhibit excellent corrosion resistance in the above-mentioned environment and a welded joint tensile strength of not less than 620 MPa, a weld metal must have a duplex structure composed of ferrite and austenite and having a high Cr concentration; i.e., specifically, the weld metal must be a duplex stainless steel containing 25% Cr.

(4) A weld metal must have a tensile strength such that a base metal ruptures in a tensile test of a welded joint, and must have a hardness not greater than a certain limit.

(5) When the above-mentioned environment is highly likely to induce occurrence of SSC, the content of C and Mn of a base metal must be limited, the addition of Ti must be made mandatory, and the hardness of HAZ must be controlled to a lower level.

The present invention is completed by combining the above items (1) to (5).

BRIEF DESCRIPTION OF DRAWINGS

FIG. 1 is a schematic view showing welded piping obtained by welding various kinds of steel pipes, wherein (a) shows welded piping obtained by circumferentially welding seamless steel pipes, (b) shows that obtained by circumferentially welding steel pipes each of which is manufactured by longitudinally seam-welding a steel plate, and (c) shows that obtained by circumferentially welding steel pipes each of which is manufactured by spirally welding a hot coil.

DESCRIPTION OF CARRYING OUT THE INVENTION

The reason for the limitations as defined in the present invention will now be described.

In the present invention, the first embodiments is a basic embodiments, and the second through fifth inventions are preferred embodiments for carrying out the first embodiment. In the following description, "%" accompanying an alloy element refers to "% by weight."

1. First Embodiment (A) Chemical composition and microstructure (a) Base metal (a-1) Chemical composition C: 0.001% to 0.05%

When the carbon content is in excess of 0.05%, the hardness of HAZ exceeds a Vickers hardness of 350, resulting in the occurrence of SSC. Therefore, the upper limit of the carbon content is determined to be 0.05%. The lower the carbon content, the better. However, the attainment of a carbon content of less than 0.001% involves a significant increase in cost. Therefore, the lower limit of the carbon content is determined to be 0.001%.

Cr: 9% to 14%

Cr is an element which effects the improvement of SSC resistance in the presence of Mo. When the chromium content is less than 9%, sufficient SSC resistance is not obtained. Also, when the chromium content is in excess of 14%, a single phase of martensite is not established, but the ferrite phase is mixedly formed, resulting in a reduction in tensile strength. Thus, the chromium content is determined to be 9% to 14%.

(a-2) Microstructure

The microstructure of a base metal must be of a single phase of martensite or tempered martensite. If austenite or ferrite is mixedly formed, sufficient strength is not obtained.

A steel pipe or steel product having the above-mentioned chemical composition is quenched to thereby assume a martensitic single-phase structure, and, as needed, is subsequently tempered to thereby assume a tempered martensitic structure; thus, predetermined mechanical properties are imparted thereto. A seamless steel pipe or steel plate is quenched through off-line reheating or direct on-line quenching. A seamless steel pipe and a steel plate are both tempered off-line or on-line. A hot coil assumes a martensitic structure through cooling performed between end of finish-rolling and start of coiling. The thus-cooled hot coil undergoes processing or is tempered before undergoing processing. A heat-treated or thermomechanically treated steel plate or hot coil is processed and then undergoes ordinary welding, which will be described later, to thereby become a steel pipe.

(b) Weld metal (b-1) Chemical composition

Cr: 22% to 27%

Cr is an element which effects the improvement of resistance to hydrogen sulfide corrosion (mainly resistance to stress corrosion cracking) in the presence of Ni and Mo. Hydrogen sulfide corrosion is a generic term referring to corrosion in an environment containing $H_2S$, as mentioned previously, and includes cracking, general cracking, and local corrosion.

When the chromium content is less than 22%, N fails to be contained in the form of solid solution in an amount desirable for attainment of a required tensile strength, and sufficient corrosion resistance is not obtained. By contrast, when the chromium content is in excess of 27%, intermetallic compounds such as the sigma (σ) phase are generated, inducing brittleness. Therefore, the chromium content is determined to be not greater than 27%.

Ni: 7% to 11%

Ni effects the improvement of resistance to hydrogen sulfide corrosion and the attainment of a duplex structure for a weld metal. In order for an as-welded weld metal to attain an optimum ferrite percentage of 35% to 75% by volume in terms of resistance to hydrogen sulfide corrosion, the nickel content is determined to be 7% to 11%. When the nickel content is less than 7%, the ferrite percentage exceeds 75% by volume; when the nickel content is in excess of 11%, the ferrite percentage becomes less than 35% by volume. In either case, sufficient corrosion resistance is not obtained.

Mo: 1.5% to 5%

Mo effects the improvement of resistance to seawater corrosion. When the molybdenum content is less than 1.5%, resistance to hydrogen sulfide corrosion is significantly impaired. By contrast, when the molybdenum content is in excess of 5%, the effect is saturated, and consequently a further significant improvement of performance is not obtained. Thus, the molybdenum content is determined to be 1.5% to 5%.

C: Not greater than 0.03%

When the carbon content is in excess of 0.03%, stress corrosion cracking is highly likely to occur at grain boundaries. Thus, the carbon content is determined to be not greater than 0.03%. The lower the carbon content of a weld metal, the better.

(b-2) Microstructure

The ferrite percentage of a weld metal must be 35% to 75% by volume so as to be optimum in terms of resistance to hydrogen sulfide corrosion. When the ferrite percentage of a weld metal is less than 35% by volume, 0.2% proof-stress is not attained. By contrast, when the ferrite percentage is in excess of 75% by volume, nitrides precipitate within ferrite; consequently, corrosion resistance in the abovementioned environment is impaired, and toughness is significantly impaired.

(B) Hardness of a welded steel structure and tensile strength of a welded joint of a welded steel structure Hardness:

A welded steel structure according to the present invention must have a Vickers hardness of not greater than 350 over the entire portion thereof. If a certain portion of the welded steel structure has a Vickers hardness in excess of 350, SSC will occur in the portion when the portion is in contact with a wet carbon dioxide environment having a low $H_2S$ concentration. In a welded steel structure, HAZ has the highest hardness. Thus, through attainment of a hardness of HAZ of not greater than 350, the hardness of the entire welded steel structure naturally becomes not greater than 350.

When a base metal and a weld metal have the above-mentioned respective chemical compositions, even HAZ has a Vickers hardness of not greater than 350 in the case of ordinary welding. Ordinary welding refers to gas tungsten arc welding (hereinafter referred to as GTAW; also called TIG welding; automatic welding), gas metal arc welding (hereinafter referred to as GMAW; including MIG welding; automatic welding), and shielded metal arc welding (hereinafter referred to as SMAW; manual welding). Heat input of ordinary welding usually ranges from 7,000 J/cm to 40,000 J/cm.

Welded piping discussed herein refers to piping obtained by circumferentially welding seamless steel pipes, steel pipes each manufactured by spirally welding a hot coil, or steel pipes each manufactured by press-working and longitudinally seam-welding a steel plate. As mentioned previously, a welded portion of a steel structure includes not only such a circumferentially welded portion but also the above-mentioned spirally welded zone and longitudinally seam-welded portion. The longitudinal seam of a steel pipe manufactured from a steel plate is usually welded by submerged arc welding (hereinafter referred to as SAW), not by the above-mentioned welding methods, at a heat input higher than the above-mentioned heat input.

Welded steel structures discussed herein also include tanks and the like.

Tensile strength of a welded joint:

In a tensile test of a welded joint, a measured tensile strength (TS) must be not less than 620 MPa, and a weld metal must not rupture. The rupture of a weld metal must not occur, because if a welded steel structure has a possibility of rupture in a portion other than a base metal, designing a structure based on the strength of a base metal becomes meaningless.

A tensile strength as measured in a tensile test of a welded joint must be not less than 620 MPa, because the design of a structure assumes that a welded steel structure serving as part of the structure has a welded joint tensile strength of not less than 620 MPa.

2. Second Embodiment

As mentioned previously, the second embodiment is an embodiment of the first embodiment. The second embodiment assumes its application to an environment ranging from a low concentration to a high concentration of hydrogen sulfide contained in a wet carbon dioxide gas. That is, an assumed environment in which the second embodiment is to be used ranges from an environment having a relatively low possibility of SSC to an environment having a relatively high possibility of SSC. Also, the second embodiment encompasses all the second through fifth embodiments, which are embodiments of the first embodiment.

(c) Base metal

C: 0.001% to 0.05%

When the carbon content is in excess of 0.05%, the hardness of HAZ exceeds a Vickers hardness of 350, resulting in the occurrence of SSC. Therefore, the upper limit of the carbon content is determined to be 0.05%. The lower the carbon content, the better. However, the attainment of a carbon content of less than 0.001% involves a significant increase in cost. Therefore, the lower limit of the carbon content is determined to be 0.001%.

Si: not greater than 1%

Si may not be added. However, if Si serving as a deoxidizer is not added, the loss of Al will increase during deoxidation with Al, resulting in diseconomy. Thus, preferably, Si is added to such a degree that free oxygen present in molten steel can be reduced to a sufficient low level; for example, Si is added in an amount of not less than 0.01%. By contrast, when the silicon content is in excess of 1%, hot workability is impaired. Therefore, the silicon content is determined to be not greater than 1%.

Mn: not greater than 5%

Mn may not be added. However, since Mn effects not only deoxidation but also fixation of S in the form of MnS, Mn is preferably added. When the manganese content is less than 0.1%, these effects are not sufficiently produced. Thus, Mn is preferably added in an amount of not less than 0.1%. However, when the manganese content is in excess of 5%, SSC resistance and hot workability are impaired. Therefore, the upper limit of the manganese content is determined to be 5%.

Cr: 9% to 14%

Cr effects the improvement of SSC resistance in the presence of Mo. When the chromium content is less than 9%, sufficient SSC resistance is not obtained. By contrast, when the chromium content is in excess of 14%, a single phase of martensite is not established, but the ferrite phase is mixedly formed, resulting in a reduction in tensile strength. Thus, the chromium content is determined to be 9% to 14%.

Ni: 0.5% to 7%

Ni is added in an amount of not less than 0.5% so that the microstructure of steel assumes a single phase of martensite through quenching to thereby obtain a predetermined tensile strength. By contrast, when the nickel content is in excess of 7%, residual austenite is mixedly formed within the microstructure, resulting in impairment in 0.2% proof stress. Therefore, the nickel content is determined to be not greater than 7%.

Mo: 0% to 4%

Mo may not be added. However, since Mo effects the improvement of SSC resistance in the presence of Cr, Mo is added when a further improvement of SSC resistance is required. However, when the molybdenum content is less than 0.5%, sufficient SSC resistance cannot be obtained. Accordingly, when Mo is to be added, the molybdenum content is preferably not less than 0.5%. By contrast, when the molybdenum content is in excess of 4%, the effect is saturated. Therefore, the molybdenum content is determined to be not greater than 4%.

sol. Al: 0.001% to 0.2%

Al effects refinement of microstructure. To obtain the effect, the sol. Al content must be not less than 0.001%. However, when the sol. Al content is in excess of 0.2%, workability is impaired. Therefore, the sol. Al content is determined to be between 0.001% and 0.2%/.

Ti: 0% to 0.2%

Ti may not be added. However, since the addition of Ti effects the decrease of solid-solution carbon contained in HAZ to thereby suppress the increase of hardness of the martensitic phase, Ti is added in order to secure SSC resistance in a severer environment. When the titanium content is less than 0.01%, the amount of C to be fixed in the form of TiC is not sufficient. Accordingly, when Ti is to be added, the titanium content is preferably not less than 0.01%. However, when the titanium content is in excess of 0.2%, the effect is saturated. Therefore, the titanium content is determined to be not greater than 0.2%.

Cu: 0% to 3%

Cu may not be added. However, since Cu, when added, effects the improvement of corrosion resistance in an environment having as low a pH as about 2, Cu is preferably added in the case of use in such an environment. When the copper content is less than 0.3%, the effect is not explicitly produced. Accordingly, when Cu is to be added, the copper content is preferably not less than 0.3%. By contrast, when the copper content is in excess of 3%, the effect is saturated, and the surface property of a slab is impaired. Therefore, the copper content is determined to be not greater than 3%.

W: 0% to 5%

W may not be added. However, W, like Mo, effects the improvement of resistance to seawater corrosion. When the tungsten content is less than 1.5%, the effect is not explicitly produced. To obtain the effect, W is preferably added in an amount of not less than 1.5%. By contrast, when the tungsten content is in excess of 5%, the effect of addition of W is saturated in the present invention. Therefore, the tungsten content is determined to be not greater than 5%.

Nb: 0% to 0.2%

Nb may not be added. However, Nb effects precipitation of carbonitrides to thereby improve toughness or 0.2% proof stress. Thus, Nb is added when a high-strength steel is to be obtained through the attainment of the effect. However, when the niobium content is less than 0.02%, the effect is not sufficient. Accordingly, when Nb is to be added, the niobium content is preferably not less than 0.02%. By contrast, when the niobium content is in excess of 0.2%, toughness is significantly impaired. Therefore, the niobium content is determined to be not greater than 0.2%.

Zr: 0% to 0.2%

Zr may not be added. Since Zr, like Ti, effects the fixation of C in the form of ZrC to thereby decrease the hardness of HAZ, Zr is added when SSC resistance is to be further improved. When the zirconium content is less than 0.02%, the effect is not explicitly produced. Accordingly, when Zr is to be added, the zirconium content is preferably not less than 0.02%. By contrast, when the zirconium content is in excess of 0.2%, SSC resistance is rather impaired. Therefore, the zirconium content is determined to be not greater than 0.2%.

Ca: 0% to 0.01%

Ca may not be added. Ca, when added, forms strong oxysulfides to thereby improve SSC resistance. Since the oxysulfides are not elongated when subjected to rolling and do not impair workability, Ca is added when high SSC resistance and workability are required. When the calcium content is less than 0.001%, the above effect is not explicitly produced. Accordingly, when Ca is to be added, the calcium content is preferably not less than 0.001%. By contrast, when the calcium content is in excess of 0.01%, nonmetallic inclusions increase in steel. Therefore, the calcium content is determined to be not greater than 0.01%.

B: 0% to 0.01%

B may not be added. Since B, when added, effects the enhancement of grain boundaries to thereby improve SSC resistance, B is added when SSC resistance is to be further improved. When the boron content is less than 0.0005%, the effect is not explicitly produced. Accordingly, when B is to be added, the boron content is preferably not less than 0.0005%. By contrast, when the boron content is in excess of 0.01%, coarse carboborides are generated, so that SSC resistance is rather impaired. Therefore, the boron content is determined to be not greater than 0.01%.

P: not greater than 0.03%

When the content of P as an unavoidable impurity is in excess of 0.03%, the potential occurrence of SSC increases in a hydrogen sulfide environment. Accordingly, the phosphorus content is determined to be not greater than 0.03%.

S: not greater than 0.01%

When the content of S as an unavoidable impurity is in excess of 0.01%, hot workability is impaired. Therefore, the sulfur content is determined to be not greater than 0.01%.

(d) Weld metal

An assumed environment in which the weld metal of the second embodiment is to be used also ranges from an environment having a relatively low possibility of occurrence of SSC to an environment having a relatively high possibility of occurrence of SSC. As mentioned previously, the content ranges of the chemical composition of the weld metal of the second embodiment encompass all the content ranges of the chemical compositions of the second to fifth embodiment, which are embodiments of the first embodiment.

Si: not greater than 1%

Si may be used as a deoxidizer; however, a positive attempt to make Si remain within a weld metal is not required. Si effects the increase of strength. However, when the silicon content is less than 0.05%, the increase of strength is not explicitly effected. Accordingly, when Si is to be added, the silicon content is preferably not less than 0.05%. By contrast, when the silicon content is in excess of 1%, large inclusions containing Si are generated, and the precipitation of the sigma ($\sigma$) phase is accelerated, resulting in an impairment in SSC resistance. Accordingly, the silicon content is determined to be not greater than 1%. In the case of use in such an environment that induces a higher likelihood of occurrence of SSC, the silicon content is preferably not greater than 0.5%.

Mn: not greater than 2%

Mn may be added as a deoxidizer; however, an attempt to make Mn remain within a weld metal is not required. However, since Mn effects the increase of strength, when Mn is to be added in order to increase strength, the manganese content is preferably not less than 0.15%. When the manganese content is less than 0.15%, the increase of strength is not explicitly effected. By contrast, when the manganese content is in excess of 2%, coarse inclusions containing Mn are generated, and the precipitation of the sigma (σ) phase is accelerated, resulting in an impairment in SSC resistance. Accordingly, the manganese content is determined to be not greater than 2%.

Cr: 22% to 27%

Cr is an element which effects the improvement of resistance to hydrogen sulfide corrosion (mainly resistance to stress corrosion cracking) in the presence of Ni, N, and Mo. When the chromium content is less than 22%, N fails to assume the form of solid solution in an amount desirable for attainment of a required tensile strength, and sufficient corrosion resistance is not obtained. By contrast, when the chromium content is in excess of 27%, intermetallic compounds such as the sigma (C) phase are generated, inducing brittleness and an impairment in SSC resistance. Therefore, the chromium content is determined to be not greater than 27%.

Ni: 7% to 11%

Ni effects the improvement of resistance to hydrogen sulfide corrosion and the attainment of a duplex structure for a weld metal. In order for an as-welded weld metal to attain an optimum ferrite percentage of 35% to 75% by volume in terms of resistance to hydrogen sulfide corrosion, the nickel content is determined to be 7% to 11%. When the nickel content is less than 7%, the ferrite percentage exceeds 75% by volume; when the nickel content is in excess of 11%, the ferrite percentage becomes less than 35% by volume. In either case, resistance to hydrogen sulfide corrosion is impaired. Therefore, the nickel content is determined to be not greater than 11%.

Mo: 1.5% to 5%

Mo effects the improvement of resistance to seawater corrosion. When the molybdenum content is less than 1.5%, resistance to hydrogen sulfide corrosion is significantly impaired. By contrast, even when the molybdenum content is in excess of 5%, a further significant improvement of performance is not recognized. Thus, the molybdenum content is determined to be 1.5% to 5%.

sol. Al: 0.005% to 0.1%

Al strongly effects the deoxidation of a molten weld metal during welding. Alumina ($Al_2O_3$) and the like formed as a result of the deoxidation serve as solidification nuclei or transformation nuclei, thereby effectively contributing to refinement. The effect is less produced unless sol. Al is present in the weld metal in an amount of not less than 0.005%. By contrast, when the sol. Al content is in excess of 0.1%, corrosion resistance is impaired. Therefore, the sol. Al content is determined to be 0.005% to 0.1%.

N: 0.05% to 0.4%

N effects a significant improvement of seawater resistance and the increase of strength of a weld metal through solid-solution strengthening. However, when the nitrogen content is less than 0.05%, a required tensile strength and corrosion resistance are not obtained. Accordingly, the nitrogen content is determined to be not less than 0.05%. By contrast, when the nitrogen content is in excess of 0.4%, blow-holes are highly likely generated in a slab or the like, there increase nitrides which do not effect strengthening, and corrosion resistance of a weld metal is impaired. Therefore, the nitrogen content is determined to be not greater than 0.4%.

Cu: 0% to 2%

Cu may not be added. However, since Cu, when added, effects the improvement of corrosion resistance in an environment having as low a pH as about 2, Cu is added when the effect is to be produced. When the copper content is in excess of 2%, the effect is saturated, and the surface property of a slab is impaired. Therefore, the copper content is determined to be not greater than 2%.

W: 0% to 3.5%

W may not be added. However, W, like Mo, effects the improvement of resistance to seawater corrosion and the suppression of the precipitation of a brittle phase. Thus, when the effect is to be produced,. W is preferably added. When the tungsten content is in excess of 3.5%, the effect is saturated. Therefore, when W is to be added, the tungsten content must be not greater than 3.5%.

Ti: 0% to 0.15%

Ti may not be added. Ti, when added, effects a reduction of hardness through fixing C in the form of TiC in a weld metal. Accordingly, when SSC resistance is to be improved through reducing the hardness of a weld metal, Ti is added. When the titanium content is in excess of 0.15%, a weld metal is significantly embrittled. Therefore, the titanium content is determined to be not greater than 0.15%.

Nb: 0% to 0.15%

Nb may not be added. Since Nb effects the improvement of toughness and 0.2% proof stress, Nb is added when the effect is to be produced. However, when the niobium content is in excess of 0.15%, toughness is significantly impaired. Therefore, the niobium content is determined to be not greater than 0.15%.

Zr: 0% to 0.15%

Zr may not be added. Since Zr, like Ti, effects a reduction of hardness of a weld metal, Zr is added when the hardness is to be further reduced. However, when the zirconium content is in excess of 0.15%, the effect is saturated. Therefore, the zirconium content is determined to be not greater than 0.15%.

Ca: 0% to 0.01%

Ca may not be added. However, Ca, when added, fixes S in the form of oxysulfides to thereby improve corrosion resistance of a weld metal. Accordingly, Ca is added in the case of a corrosive environment having a relatively high $H_2S$ concentration. When the calcium content is less than 0.001%, the effect is not explicitly produced. Accordingly, when Ca is to be added, the calcium content is preferably not less than 0.001%. By contrast, when the calcium content is in excess of 0.01%, corrosion resistance is rather impaired. Therefore, the calcium content is determined to be not greater than 0.01%.

B: 0% to 0.01%

B may not be added. However, B, when added, effects the suppression of precipitation of intermetallic compounds such as the sigma (σ) phase in a weld metal to thereby improve corrosion resistance. When the boron content is less than 0.0005%, the effect is not explicitly produced. Accordingly, when B is to be added, the boron content is preferably not less than 0.0005%. By contrast, when the boron content is in excess of 0.01%, boron nitride, BN, is generated, resulting in an impairment of corrosion resistance. Therefore, the boron content is determined to be not greater than 0.01%.

C: not greater than 0.03%

When the carbon content is in excess of 0.03%, stress corrosion cracking is highly likely to occur at grain boundaries. Thus, the carbon content is determined to be not greater than 0.03%. The lower the carbon content of a weld metal, the better.

P: not greater than 0.02%

When the content of P as an unavoidable impurity is in excess of 0.02%, the potential occurrence of stress corrosion cracking increases in a hydrogen sulfide environment. Accordingly, the phosphorus content is determined to be not greater than 0.02%.

S: not greater than 0.01%

When the content of S as an unavoidable impurity is in excess of 0.01%, SSC susceptibility increases. Therefore, the sulfur content is determined to be not greater than 0.01%.

3. Third Embodiment

The third embodiment is different from the second invention in the Mn, Cu, and W contents of a weld mental as described below in (e). Other alloy components of a weld metal and the chemical composition of a base metal are identical to those of the second embodiment. The third embodiment is applicable to a corrosive environment ranging substantially as wide as that to which the second invention is applicable, and is characterized in that corrosion resistance of a weld metal is improved, as compared with the second embodiment.

(e) Weld metal

Mn: not greater than 1.5%

Mn may be added as a deoxidizer; however, an attempt to make Mn remain within a weld metal is not required. However, since Mn effects the increase of strength, when Mn is to be added in order to increase strength, the manganese content is preferably not less than 0.15%. When the manganese content is less than 0.15%, the increase of strength is not explicitly effected. By contrast, when the manganese content is in excess of 1.5%, coarse inclusions containing Mn are generated, and the precipitation of the σ phase is accelerated, resulting in an impairment in SSC resistance. Accordingly, the manganese content is determined to be not greater than 1.5%.

Cu: 0.3% to 2%

Cu effects the improvement of corrosion resistance in an environment having as low a pH as about 2. When the copper content is less than 0.3%, the effect is not explicitly produced. Accordingly, the copper content is determined to be not less than 0.3%. By contrast, when the copper content is in excess of 2%, the effect is saturated, and the surface property of a slab is impaired. Therefore, the copper content is determined to be not greater than 2%.

W: 1.5% to 3.5%

W, like Mo, effects the improvement of resistance to seawater corrosion and the suppression of the precipitation of a brittle phase. When the tungsten content is less than 1.5%, the effect is not produced to a required degree. Accordingly, the tungsten content is determined to be not less than 1.5%. By contrast, when the tungsten content is in excess of 3.5%, the effect is saturated. Therefore, the tungsten content is determined to be not greater than 3.5%.

4. Fourth Embodiment

The fourth embodiment is characterized by having a base metal capable of suppressing the occurrence of SSC even in a wet carbon dioxide environment having a high $H_2S$ concentration. The fourth invention is different from the second embodiment in the C, Mn, Cr, Ni, Mo, Ti, Cu, W, Nb, and Zr contents of a base metal as described below in (f) and in the Mo, cu, W, Nb, and Zr contents of a weld metal as described below in (g). Other alloy components of both base metal and weld zone are identical to those of the second embodiment.

(f) Base metal

C: 0.001% to 0.01%

When the carbon content is in excess of 0.01%, the hardness of HAZ exceeds a Vickers hardness of 350, resulting in the occurrence of SSC in an environment having a high $H_2S$ concentration. Therefore, the upper limit of the carbon content is determined to be 0.01%. The lower the carbon content, the better. However, the attainment of a carbon content of less than 0.001% involves a significant increase in cost. Therefore, the lower limit of the carbon content is determined to be 0.001%.

Mn: not greater than 0.5%

Mn may not be added. However, since Mn effects not only deoxidation but also fixation of S in the form of MnS, Mn is preferably added. When the manganese content is less than 0.1%, these effects are not sufficiently produced. Thus, Mn is preferably added in an amount of not less than 0.1%. However, when the manganese content is in excess of 0.5%, SSC is highly likely to occur in an environment having a high $H_2S$ concentration. Therefore, the upper limit of the manganese content is determined to be 0.5%.

Cr: 11% to 14%

Cr effects the improvement of SSC resistance in the presence of Mo. When the chromium content is less than 11%, sufficient SSC resistance is not obtained in a wet carbon dioxide environment having a high $H_2S$ concentration. By contrast, when the chromium content is in excess of 14%, a single phase of martensite is not established, but the ferrite phase is mixedly formed, resulting in a reduction in tensile strength. Thus, the chromium content is determined to be 11% to 14%.

Ni: 4.5% to 7%

Ni is added in an amount of not less than 4.5% so that the microstructure of steel assumes a single phase of martensite even at a low carbon content through quenching to thereby obtain a predetermined tensile strength. By contrast, when the nickel content is in excess of 7%, residual austenite is mixedly formed within the microstructure, resulting in impairment in 0.2% proof stress. Therefore, the nickel content is determined to be not greater than 7%.

Mo: 1.5% to 4%

Since Mo effects the improvement of SSC resistance in the presence of Cr, Mo is added in the fourth embodiment in which a further improvement of SSC resistance is attained. However, when the molybdenum content is less than 1.5%, sufficient SSC resistance cannot be obtained. Accordingly, the molybdenum content is determined to be not less than 1.5%. By contrast, when the molybdenum content is in excess of 4%, the effect is saturated. Therefore, the molybdenum content is determined to be not greater than 4%.

Ti: 0.01% to 0.2%

Since Ti effects the decrease of solid-solution carbon contained in HAZ to thereby suppress the increase of hardness of the martensitic phase, Ti is a mandatory element in the present invention which provides secure SSC resistance in a severer environment. When the titanium content is less than 0.01%, the amount of C to be fixed in the form of TiC is not sufficient. Accordingly, the titanium content is determined to be not less than 0.01%. However, when the titanium content is in excess of 0.2%, the effect is saturated, and toughness is significantly impaired. Therefore, the titanium content is determined to be not greater than 0.2%.

Cu, W, Nb, Zr : intentionally not added

When other elements of the chemical composition of the fourth embodiment fall within the above-mentioned ranges of content, the addition of any of Cu, W, Nb, and Zr rather induces an impairment of SSC resistance or produces no improving effect. Accordingly, these elements are determined to be intentionally not added.

(g) Weld metal

Mo: 2.5% to 5%

Mo effects the improvement of resistance to seawater corrosion. When the molybdenum content is less than 2.5%, resistance to hydrogen sulfide corrosion is significantly impaired in a severe corrosive environment. By contrast, even when the molybdenum content is in excess of 5%, a further significant improvement of performance is not recognized. Thus, the molybdenum content is determined to be 2.5% to 5%.

Cu, W, Nb, Zr: intentionally not added

If Mo is contained in an amount falling within the abovementioned range, a weld metal exhibits sufficient corrosion resistance even when Cu, W, Nb, and Zr are not added. Accordingly, these elements are determined to be intentionally not added.

5. Fifth Embodiment

An object of the fifth embodiment is to enable both base metal and weld metal to become resistant to a wet hydrogen sulfide environment having a high $H_2S$ concentration. Accordingly, the fifth embodiment limits the chemical compositions of both base metal and weld metal to such ranges as to be resistant to the severest environment among environments to which the embodiments of the first embodiment are to be applied.

The fifth embodiment is different from the second embodiment in the C, Mn, Cr, Ni, Mo, Ti, Cu, W, Nb, and Zr contents of a base metal and in the Mn, Cu, W, Nb, and Zr contents of a weld metal. Since the fifth embodiment has the same chemical composition of a base metal as that of the fourth embodiment, the description of the chemical composition of a base metal is omitted. The chemical composition of a weld metal is described below.

(h) Weld metal

Mn: not greater than 1.5%

Mn may be added as a deoxidizer; however, an attempt to make Mn remain within a weld metal is not required. However, since Mn effects the increase of strength, when Mn is to be added in order to increase strength, the manganese content is preferably not less than 0.15%. When the manganese content is less than 0.15%, the increase of strength is not explicitly effected. By contrast, when the manganese content is in excess of 1.5%, coarse inclusions containing Mn are generated, and the precipitation of the σ phase is accelerated, resulting in an impairment in SSC resistance. Accordingly, the manganese content is determined to be not greater than 1.5%.

Cu: 0.3% to 2%

Cu effects the improvement of corrosion resistance in an environment having as low a pH as about 2. When the copper content is less than 0.3%, the effect is not explicitly produced. Accordingly, the copper content is determined to be not less than 0.3%. By contrast, when the copper content is in excess of 2%, the effect is saturated, and the surface property of a slab is impaired. Therefore, the copper content is determined to be not greater than 2%.

W: 1.5% to 3.5%

W, like Mo, effects the improvement of resistance to seawater corrosion and the suppression of the precipitation of a brittle phase. When the tungsten content is less than 1.5%, the effect is not produced to a required degree. Accordingly, the tungsten content is determined to be not less than 1.5%. By contrast, when the tungsten content is in excess of 3.5%, the effect is saturated. Therefore, the tungsten content is determined to be not greater than 3.5%.

Nb, Zr: intentionally not added

When W is added as a mandatory element in an amount ranging between 1.5% and 3.5% as described above, the addition of Nb and Zr may not effect the improvement of corrosion resistance or may rather impair corrosion resistance. Thus, Nb and Zr are determined to be not added.

EXAMPLES

Table 1 shows the chemical compositions of the base metals subjected to the experiment. Each of the steels having the chemical compositions shown in Table 1 was manufactured in a molten form through use of an electric furnace. The molten steel was refined through use of an Ar-oxygen-decarburizing furnace (AOD furnace) for the purpose of desulfurization. Subsequently, the refined molten steel was cast to obtain an ingot having a diameter of 500 mm. The ingot was heated to 1200° C. and then hot-forged to obtain a billet having a diameter of 225 mm. Then, the billet was subjected to the Mannesmann process to obtain a seamless steel pipe having a diameter of 168 mm and a wall thickness of 12 mm. Subsequently, the seamless steel pipe was quenched and tempered to obtain a steel pipe (base metal) having a 0.2% proof stress of 80 ksi to 95 ksi (550 MPa to 654 MPa) equivalent to an X80 grade steel pipe as specified in the API standard.

TABLE 1

| Base metal No. | C | Si | Mn | P | S | Cr | Ni | Mo | sol. Al | Ti |
|---|---|---|---|---|---|---|---|---|---|---|
| M1 | 0.003 | 0.32 | 2.50 | 0.04 | 0.003 | 9.3 | 0.3 | — | 0.025 | — |
| M2 | 0.006 | 0.25 | 1.20 | 0.01 | 0.001 | 12.7 | 4.3 | 0.6 | 0.019 | 0.08 |
| M3 | 0.007 | 0.19 | 0.43 | 0.01 | 0.001 | 12.1 | 5.5 | 2.0 | 0.011 | 0.09 |
| M4 | 0.010 | 0.24 | 0.39 | 0.01 | 0.001 | 11.5 | 6.8 | 3.1 | 0.009 | 0.12 |
| M5 | 0.007 | 0.29 | 0.35 | 0.01 | 0.002 | 11.9 | 6.0 | 2.5 | 0.012 | 0.08 |
| M6 | 0.006 | 0.30 | 0.40 | 0.01 | 0.001 | 12.8 | 5.2 | 1.3 | 0.013 | 0.07 |
| M7 | 0.003 | 0.22 | 0.23 | 0.01 | 0.001 | 12.5 | 5.9 | 1.9 | 0.021 | — |
| M8 | 0.005 | 0.36 | 0.48 | 0.01 | 0.001 | 11.8 | 5.5 | 1.5 | 0.018 | 0.06 |
| M9 | 0.002 | 0.40 | 4.46 | 0.03 | 0.001 | 10.2 | 0.1 | — | 0.005 | — |
| M10 | 0.003 | 0.31 | 4.21 | 0.01 | 0.001 | 12.1 | 1.5 | 0.7 | 0.008 | — |
| *M11 | 0.020 | 0.56 | 0.72 | 0.02 | 0.001 | 13.2 | 0.9 | 1.1 | 0.016 | — |
| *M12 | 0.053* | 0.20 | 0.35 | 0.01 | 0.001 | 11.9 | 5.4 | 2.1 | 0.015 | — |

Base metal No. or content marked with * falls outside the scope of the invention.

| Base metal No. | Nb | Zr | Cu | W | Ca | B | N | Microstructure |
|---|---|---|---|---|---|---|---|---|
| M1 | — | — | — | — | — | — | 0.032 | Single phase of martensite |

TABLE 1-continued (wt. %)

| | | | | | | | | |
|---|---|---|---|---|---|---|---|---|
| M2 | — | — | — | — | 0.0023 | — | 0.002 | Single phase of martensite |
| M3 | — | — | — | — | 0.0031 | — | 0.003 | Single phase of martensite |
| M4 | — | — | — | — | 0.0012 | — | 0.002 | Single phase of martensite |
| M5 | — | — | — | — | 0.0018 | — | 0.001 | Single phase of martensite |
| M6 | — | — | — | 1.2 | — | — | 0.002 | Single phase of martensite |
| M7 | — | 0.15 | — | — | — | — | 0.001 | Single phase of martensite |
| M8 | — | — | 1.5 | — | 0.0025 | — | 0.003 | Single phase of martensite |
| M9 | — | — | — | — | — | — | 0.004 | Single phase of martensite |
| M10 | 0.06 | — | — | — | — | 0.0015 | 0.002 | Single phase of martensite |
| *M11 | — | — | — | — | — | — | 0.004 | Martensite + ferrite (60%)* |
| *M12 | — | — | — | — | — | — | 0.003 | Single phase of martensite |

Base metal No. or microstructure marked with * falls outside the scope of the invention.

Table 2 shows the chemical compositions of the welding materials. Each of the steels having the chemical compositions shown in Table 2 was manufactured in the primary molten form through use of an ordinary electric furnace. The molten steel was refined through use of the Ar-oxygen-decarburizing furnace (AOD furnace) for the purpose of desulfurization. Subsequently, the refined molten steel was cast to obtain an ingot. The ingot was heated to 1200° C. and then forged to obtain a round bar having a diameter of 10 mm. The round bar was wire-drawn to obtain a welding material (wire) for automatic welding (GTAW and GMAW). Also, the same material was used to manufacture a welding material for shielded metal arc welding (SMAW), i.e. a welding rod for manual welding. In Table 2, the chemical composition of the welding material W5 is that of the core wire of a welding rod for shielded metal arc welding, and is identical to that of W4.

Table 3 shows the chemical composition of coating flux with which the core wire having the chemical composition of the above-mentioned W5 is coated to become a shielded metal arc welding rod.

TABLE 2

| Welding metal No. | Chemical composition of welding material (wt. %) | | | | | | | | | | | | | | Welding method |
|---|---|---|---|---|---|---|---|---|---|---|---|---|---|---|---|
| | C | Si | Mn | P | S | Cr | Ni | Mo | sol. Al | Cu | W | N | Ca | B | |
| W1 | 0.016 | 0.16 | 0.28 | 0.01 | 0.001 | 26.6 | 11.5 | 4.1 | 0.020 | — | — | 0.03 | 0.0032 | 0.0011 | GTAW |
| W2 | 0.019 | 0.40 | 1.04 | 0.01 | 0.002 | 26.8 | 9.4 | 4.4 | 0.021 | 0.6 | — | 0.29 | 0.0025 | 0.0013 | GTAW |
| W3 | 0.026 | 0.70 | 0.80 | 0.01 | 0.001 | 25.0 | 9.8 | 3.2 | 0.013 | 0.4 | 2.3 | 0.35 | 0.0036 | 0.0020 | GMAW |
| W4 | 0.020 | 0.41 | 0.99 | 0.01 | 0.001 | 25.8 | 9.4 | 3.1 | 0.014 | 1.1 | 2.1 | 0.37 | 0.0028 | 0.0015 | GTAW |
| W5 | 0.020 | 0.41 | 0.99 | 0.01 | 0.001 | 25.8 | 9.4 | 3.1 | 0.014 | 1.1 | 2.1 | 0.37 | 0.0028 | 0.0015 | SMAW |
| W6 | 0.017 | 0.53 | 0.76 | 0.02 | 0.001 | 24.3 | 9.9 | 2.6 | 0.015 | 1.0 | 2.8 | 0.35 | 0.0029 | 0.0013 | GTAW |
| W7 | 0.010 | 0.65 | 0.95 | 0.02 | 0.001 | 24.7 | 8.4 | 2.6 | 0.020 | 0.9 | 2.3 | 0.38 | — | — | GTAW |
| W8 | 0.022 | 0.66 | 0.74 | 0.02 | 0.001 | 12.2 | 5.8 | 1.9 | 0.022 | — | — | — | — | — | GTAW |
| W9 | 0.013 | 0.49 | 0.97 | 0.02 | 0.002 | 22.4 | 7.6 | 3.1 | 0.019 | — | — | 0.36 | — | — | GTAW |
| W10 | 0.017 | 0.35 | 0.67 | 0.01 | 0.001 | 25.5 | 13.7 | 2.5 | 0.021 | 0.4 | — | 0.41 | 0.0025 | — | GTAW |
| W11 | 0.020 | 0.42 | 0.39 | 0.01 | 0.001 | 26.9 | 7.0 | 3.5 | 0.015 | — | 2.2 | 0.21 | 0.0015 | — | GTAW |

TABLE 3

(wt. %)

| T-CaO | TiO | SiO | MnO | $Al_2O_3$ | Cr | Ni | W | MgO | $Na_2O$ | $K_2O$ |
|---|---|---|---|---|---|---|---|---|---|---|
| 13.9 | 41.7 | 3.6 | 3.9 | 3.3 | 12.8 | 3.0 | 3.1 | 0.1 | 0.1 | 1.2 |

The above-mentioned steel pipes of each pair were butted each other while their center axes were aligned with each other. The butted portion was circumferentially welded through use of the welding material shown in Table 2. The circumferential welding was automatically performed through employment of gas tungsten arc welding (GTAW) and gas metal arc welding (GMAW) and was manually performed through employment of shielded metal arc welding (SMAW). The employed welding position was the 5G position (as specified in ASME), i.e. welding was performed in such a manner that a welding torch was turned around the fixed steel pipes. The input heat of welding was 12,000 J/cm in every welding. The base metal and welding method (welding material) were varied to obtain a total of 22 kinds of welded joints.

Table 4 shows combinations of base metal, welding material, and welding method.

TABLE 4

| Test No. | Base metal No. | Welding material No. | Welding method |
|---|---|---|---|
| Examples of the Invention | | | |
| J1 | M1 | W1 | GTAW |
| J2 | M2 | W2 | GTAW |
| J3 | M3 | W4 | GTAW |
| J4 | M4 | W4 | GTAW |
| J5 | M5 | W1 | GTAW |
| J6 | M5 | W2 | GTAW |
| J7 | M5 | W3 | GMAW |
| J8 | M5 | W4 | GTAW |
| J9 | M5 | W5 | SMAW |
| J10 | M5 | W6 | GTAW |

TABLE 4-continued

| Test No. | Base metal No. | Welding material No. | Welding method |
|---|---|---|---|
| J11 | M5 | W7 | GTAW |
| J12 | M6 | W6 | GTAW |
| J13 | M7 | W4 | GTAW |
| J14 | M8 | W4 | GTAW |
| J15 | M9 | W7 | GTAW |
| J16 | M10 | W4 | GTAW |
| Comp. Examples | | | |
| J17 | M5 | W8 | GTAW |
| J18 | M5 | W9 | GTAW |
| J19 | M5 | W10 | GTAW |
| J20 | M5 | W11 | GTAW |
| J21 | M11* | W4 | GTAW |
| J22 | M12* | W1 | GTAW |

Base metal No. marked with * falls outside the scope of the invention.

Table 5 shows the chemical composition of a weld metal for these 22 kinds of welded joints.

TABLE 5

| Test No. | Base metal No. | Chemical composition of weld metal (wt. %) | | | | | | | | sol. Al | Ti |
|---|---|---|---|---|---|---|---|---|---|---|---|
| | | C | Si | Mn | P | S | Cr | Ni | Mo | | |
| Examples of the Invention | | | | | | | | | | | |
| J1 | M1 | 0.018 | 0.20 | 0.45 | 0.02 | 0.001 | 25.4 | 10.4 | 3.8 | 0.020 | — |
| J2 | M2 | 0.017 | 0.35 | 1.02 | 0.01 | 0.002 | 25.9 | 9.0 | 4.1 | 0.020 | 0.01 |
| J3 | M3 | 0.018 | 0.36 | 0.90 | 0.01 | 0.001 | 25.1 | 8.8 | 3.0 | 0.012 | 0.01 |
| J4 | M4 | 0.017 | 0.34 | 0.88 | 0.01 | 0.001 | 25.0 | 9.1 | 3.1 | 0.012 | 0.02 |
| J5 | M5 | 0.014 | 0.20 | 0.29 | 0.01 | 0.001 | 25.7 | 10.9 | 3.8 | 0.018 | 0.01 |
| J6 | M5 | 0.016 | 0.38 | 0.94 | 0.01 | 0.002 | 26.0 | 8.9 | 4.2 | 0.020 | 0.01 |
| J7 | M5 | 0.024 | 0.61 | 0.75 | 0.01 | 0.001 | 24.1 | 9.4 | 2.9 | 0.013 | 0.01 |
| J8 | M5 | 0.018 | 0.37 | 0.92 | 0.01 | 0.001 | 25.0 | 8.8 | 3.0 | 0.013 | 0.02 |
| J9 | M5 | 0.019 | 0.35 | 0.89 | 0.01 | 0.002 | 25.2 | 8.9 | 2.9 | 0.010 | 0.03 |
| J10 | M5 | 0.014 | 0.48 | 0.68 | 0.02 | 0.001 | 23.5 | 9.5 | 2.6 | 0.014 | 0.01 |
| J11 | M5 | 0.009 | 0.60 | 0.82 | 0.01 | 0.002 | 24.1 | 7.7 | 2.5 | 0.019 | 0.01 |
| J12 | M6 | 0.015 | 0.48 | 0.68 | 0.01 | 0.001 | 23.5 | 9.4 | 2.4 | 0.014 | 0.01 |
| J13 | M7 | 0.018 | 0.36 | 0.91 | 0.01 | 0.001 | 25.1 | 9.1 | 3.0 | 0.015 | — |
| J14 | M8 | 0.018 | 0.39 | 0.89 | 0.01 | 0.001 | 25.0 | 9.0 | 2.9 | 0.015 | 0.01 |
| J15 | M9 | 0.012 | 0.61 | 1.24 | 0.02 | 0.001 | 24.1 | 7.6 | 2.4 | 0.010 | — |
| J16 | M10 | 0.020 | 0.36 | 1.12 | 0.01 | 0.001 | 25.0 | 8.9 | 2.9 | 0.009 | — |
| Comp. Examples | | | | | | | | | | | |
| J17 | M5 | 0.020 | 0.58 | 0.69 | 0.01 | 0.001 | 12.1* | 5.4* | 2.0 | 0.020 | 0.01 |
| J18 | M5 | 0.012 | 0.45 | 0.92 | 0.02 | 0.002 | 21.3* | 7.2 | 3.0 | 0.018 | 0.01 |
| J19 | M5 | 0.015 | 0.33 | 0.60 | 0.01 | 0.001 | 24.8 | 13.4 | 2.3 | 0.015 | 0.01 |
| J20 | M5 | 0.018 | 0.40 | 0.35 | 0.01 | 0.001 | 25.8 | 6.6* | 3.4 | 0.011 | 0.01 |
| J21 | M11* | 0.019 | 0.43 | 0.93 | 0.01 | 0.001 | 24.9 | 8.6 | 2.9 | 0.012 | — |
| J22 | M12* | 0.019 | 0.19 | 0.51 | 0.02 | 0.001 | 25.5 | 10.6 | 3.7 | 0.021 | — |

| Test No. | Base metal No. | Chemical composition of weld metal (wt. %) | | | | | | | Microstructure Ferrite vol. % |
|---|---|---|---|---|---|---|---|---|---|
| | | Nb | Zr | Cu | W | Ca | B | N | |
| Examples of the Invention | | | | | | | | | |
| J1 | M1 | — | — | — | — | 0.0015 | 0.0010 | 0.03 | 74 |
| J2 | M2 | — | — | 0.5 | — | 0.0023 | 0.0010 | 0.25 | 61 |

TABLE 5-continued

| | | | | | | | | | |
|---|---|---|---|---|---|---|---|---|---|
| J3 | M3 | — | — | 0.9 | 1.9 | 0.0022 | 0.0011 | 0.33 | 47 |
| J4 | M4 | — | — | 0.8 | 1.9 | 0.0018 | 0.0013 | 0.34 | 45 |
| J5 | M5 | — | — | — | — | 0.0022 | 0.0009 | 0.02 | 73 |
| J6 | M5 | — | — | 0.5 | — | 0.0019 | 0.0012 | 0.26 | 62 |
| J7 | M5 | — | — | 0.3 | 1.8 | 0.0029 | 0.0016 | 0.30 | 44 |
| J8 | M5 | — | — | 0.9 | 1.8 | 0.0021 | 0.0011 | 0.34 | 46 |
| J9 | M5 | — | — | 0.7 | 1.9 | 0.0011 | 0.0010 | 0.32 | 49 |
| J10 | M5 | — | — | 0.9 | 2.5 | 0.0022 | 0.0009 | 0.32 | 39 |
| J11 | M5 | — | — | 0.8 | 2.0 | 0.0002 | — | 0.32 | 48 |
| J12 | M6 | — | — | 0.8 | 2.6 | 0.0020 | 0.0010 | 0.30 | 36 |
| J13 | M7 | — | 0.02 | 0.9 | 1.9 | 0.0021 | 0.0014 | 0.33 | 46 |
| J14 | M8 | — | — | 1.2 | 1.9 | 0.0020 | 0.0013 | 0.32 | 47 |
| J15 | M9 | — | — | 0.8 | 2.0 | — | — | 0.34 | 43 |
| J16 | M10 | 0.01 | — | 0.9 | 1.9 | 0.0020 | 0.0014 | 0.31 | 50 |
| Comp. Examples | | | | | | | | | |
| J17 | M5 | — | — | — | — | 0.0003 | — | — | 36 |
| J18 | M5 | — | — | — | — | 0.0001 | — | 0.32 | 40 |
| J19 | M5 | — | — | 0.3 | 1.3 | 0.0019 | — | 0.38 | 10* |
| J20 | M5 | — | — | — | 2.1 | 0.0012 | — | 0.18 | 80* |
| J21 | M11* | — | — | 0.8 | 1.8 | 0.0015 | 0.0013 | 0.32 | 50 |
| J22 | M12* | — | — | — | — | 0.0020 | 0.0009 | 0.03 | 74 |

Base metal No. or value marked with * falls outside the scope of the invention.

Test pieces mentioned below were obtained from each welded piping in the as-welded state, and subjected to the tensile test, hardness measurement, and SSC resistance test.

(a) Tensile test

Test temperature: room temperature

Test piece: 4.0 mm diameter; length of parallel portion 20 mm (b) Hardness measurement Hardness was measured along a hardness measurement line which crosses the base metal and weld metal, in accordance with the Vickers hardness test under a load of 9.8 N (kgf). In the cross section of the circumferentially welded zone, a hardness measurement line was a straight line located 0.5 mm into the wall of a steel pipe from the inner surface of the steel pipe and extending in parallel with the inner surface of the steel pipe. Hardness was measured at 0.2 mm intervals over a length of 4 cm to obtain the distribution of hardness in the weld metal and base metal. Evaluation was based on a maximum measured hardness. The effect of the first layer of circumferential welding on hardness shows up most strongly at the point located 0.5 mm into the wall of a steel pipe from the inner surface of the steel pipe.

(c) SSC resistance

The test was conducted through use of the following two kinds of solution.

Solution A: 5% NaCl solution saturated with $H_2S$ having a partial pressure of 0.001 MPa (0.01 atm ) atm and $CO_2$ having a partial pressure of 3 MPa (30 atm)

Solution B: 5% NaCl solution saturated with $H_2S$ having a partial pressure of 0.01 MPa (0.01 atm) and $CO_2$ having a partial pressure of 3 MPa (30 atm)

Test temperature: 25° C.

Immersion time: 720 h

Applied stress: 100% of the actual 0.2% proof stress of base metal

Test piece: 4-point bending test piece measuring 100 mm (width)×2 mm (thickness)×75 mm (length) and having HAZ at the center Table 6 shows the results of these tests.

TABLE 6

| Test No. | Base metal No. | Welding material No. | Welding Method | Maximum hardness[1] | Tensile test of welded joint | | Welded joint | Sulfide stress cracking[2] | |
|---|---|---|---|---|---|---|---|---|---|
| | | | | | Tensile strength (Mpa) | Rupture position | bond toughness vE-40 (J) | Test solution A | Test solution B |
| Examples of the Invention | | | | | | | | | |
| J1 | M1 | W1 | GTAW | ○ | 708 | Base metal | 113 | ○ | x |
| J2 | M2 | W2 | GTAW | ○ | 708 | Base metal | 93 | ○ | x |
| J3 | M3 | W4 | GTAW | ○ | 725 | Base metal | 97 | ○ | ○ |
| J4 | M4 | W4 | GTAW | ○ | 713 | Base metal | 102 | ○ | ○ |
| J5 | M5 | W1 | GTAW | ○ | 712 | Base metal | 79 | ○ | ○ |
| J6 | M5 | W2 | GTAW | ○ | 718 | Base metal | 108 | ○ | ○ |
| J7 | M5 | W3 | GMAW | ○ | 720 | Base metal | 112 | ○ | ○ |
| J8 | M5 | W4 | GTAW | ○ | 724 | Base metal | 78 | ○ | ○ |
| J9 | M5 | W5 | SMAW | ○ | 719 | Base metal | 100 | ○ | ○ |
| J10 | M5 | W6 | GTAW | ○ | 730 | Base metal | 70 | ○ | ○ |
| J11 | M5 | W7 | GTAW | ○ | 712 | Base metal | 90 | ○ | ○ |

TABLE 6-continued

| Test No. | Base metal No. | Welding material No. | Welding Method | Maximum hardness[1] | Tensile test of welded joint | | Welded joint bond toughness vE-40 (J) | Sulfide stress cracking[2] | |
|---|---|---|---|---|---|---|---|---|---|
| | | | | | Tensile strength (Mpa) | Rupture position | | Test solution A | Test solution B |
| J12 | M6 | W6 | GTAW | ○ | 722 | Base metal | 120 | ○ | x |
| J13 | M7 | W4 | GTAW | ○ | 702 | Base metal | 110 | ○ | ○ |
| J14 | M8 | W4 | GTAW | ○ | 724 | Base metal | 98 | ○ | ○ |
| J15 | M9 | W7 | GTAW | ○ | 729 | Base metal | 71 | ○ | x |
| J16 | M10 | W4 | GTAW | ○ | 722 | Base metal | 83 | ○ | x |
| Comp. Examples | | | | | | | | | |
| J17 | M5 | W8 | GTAW | x | 720 | Base metal | 107 | x | x |
| J18 | M5 | W9 | GTAW | ○ | 612 | Weld metal | 95 | ○ | ○ |
| J19 | M5 | W10 | GTAW | ○ | 617 | Weld metal | 117 | ○ | ○ |
| J20 | M5 | W11 | GTAW | ○ | 812 | Base metal | 18 | ○ | ○ |
| J21 | M11 | W4 | GTAW | ○ | 600 | Base metal | 105 | x | x |
| J22 | M12 | W1 | GTAW | x | 740 | Base metal | 100 | x | x |

[1] Maximum hardness: ○: a Vickers hardness of not greater than 350; x: a Vickers hardness in excess of 350
[2] Sulfide stress cracking: x: present: ○: absent As seen from the test results, welded pipings according to the present invention represented by test Nos. J1 through J16 exhibit a Vickers hardness of not greater than 350 while having a tensile strength of 620 MPa, have excellent corrosion resistance in an environment saturated with $H_2S$ having a partial pressure of at least 0.001 MPa (0.01 atm), and can apparently be used in an environment saturated with $H_2S$ having a partial pressure of 0.001 MPa (0.01 atm ) through increasing the amount of Mo.

In the comparative example represented by test No. J17, welding: was conducted through use of a martensitic stainless steel as a welding material. As shown in Table 5, the chemical composition of the weld metal fell outside a relevant range as specified in the present invention. Also, the maximum hardness was in excess of a Vickers hardness of 350, and SSC occurred in both of the two kinds of solution.

In the comparative example represented by J18, welding was conducted through use of a duplex stainless steel containing 22% Cr. The Cr content of the weld metal fell outside a relevant range as specified in the present invention. As a result, the weld metal was lack of strength; consequently, a weld metal rupture occurred in the tensile test of the welded joint. Also, the tensile strength is less than a target value of 620 MPa.

In the comparative example represented by J19, the ferrite percentage of the weld metal was 10% by volume; consequently, a weld metal rupture occurred due to lack of strength of the weld metal. Also, the tensile strength is relatively low.

In the comparative example represented by J20, the ferrite percentage of the weld metal was 80% by volume; consequently, toughness was significantly impaired.

In the comparative example represented by J21, the microstructure of the base metal was not of a single phase of martensite, and ferrite was contained in an amount of 60% by volume; consequently, in the tensile test of the welded joint, the tensile strength was less than a target value of 620 MPa even though a base metal rupture occurred. Also, SCC occurred in both of the two kinds of solution.

In the comparative example represented by J22, since the C content of the base metal was in excess of 0.05%, the maximum hardness of HAZ was in excess of 350. Thus, SSC occurred in both of the two kinds of solution.

INDUSTRIAL APPLICABILITY

A welded steel structure according to the present invention, which is composed of an improved inexpensive steel containing 13% Cr serving as a base metal and an improved duplex stainless steel serving as a weld metal, exhibits the prevention of SSC in HAZ and corrosion of the weld metal in a wet carbon dioxide environment having a low $H_2S$ concentration, and also exhibits a welded joint tensile strength of not less than 620 MPa.

Accordingly, a welded steel structure according to the present invention exhibits excellent SSC resistance and corrosion resistance when used as any of the following: desulfurizers for petroleum, oil tanks, and piping for geothermal plants, which are in contact with petroleum, natural gas, geothermal steam, or the like which mixedly contains a wet carbon dioxide gas having a low $H_2S$ concentration; particularly when used as petroleum or natural gas piping.

Thus, the present invention inexpensively provides a basic material which is very important for industries relating to petroleum and the like.

What is claimed is:

1. A welded high-strength steel structure having an excellent corrosion resistance in a wet carbon dioxide environment with a low $H_2S$ concentration, a Vickers hardness of not greater than 350 and a welded joint tensile strength of not less than 620 MPa, said steel structure comprising:

a) a martensitic stainless steel as a base metal whose microstructure is of the martensitic phase or tempered martensitic phase and whose chemical composition includes, on a weight basis:
        C: 0.001% to 0.05%
        Cr: 9% to 14%
        Si: not greater than 1%
        Mn: not greater than 5%
        Ni: 4.5% to 7%
        sol. Al: 0.001% to 0.2%
        Mo: 0% to 4%
        Cu: 0% to 3%
        W: 0% to 5%
        Ti: 0% to 0.2%
        Nb: 0% to 0.2%
        Zr: 0% to 0.2%
        Ca: 0% to 0.01%

B: 0% to 0.01% and the balance of Fe and unavoidable impurities as

P: not greater than 0.03% and

S: not greater than 0.01%; and b) an austenitic-ferritic stainless steel as a weld metal whose micrtostructure is a duplex structure composed of the austenitic phase and 35% to 75% by volume of the ferritic phase and whose chemical composition includes, on a weight basis:

Cr: 22% to 27%

Ni: 7% to 11%

Mo: 1.5% to 5%

Si: not greater than 1%

Mn: not greater than 2% sol. Al: 0.005% to 0.1%

N: 0.22% to 0.4%

Cu: 0.0% to 2.0%

W: 0.0% to 3.5%

Ti: 0.0% to 0.15%

Nb: 0.0% to 0.15%

Zr: 0.0% to 0.15%

Ca: 0.0% to 0.01%

B: 0.0% to 0.01% and the balance of Fe and unavoidable impurities including

C: not greater than 0.03% p: not greater than 0.02% and

S: not greater than 0.01%.

2. A welded steel structure as described in claim 1, wherein the chemical composition of the weld metal contains:

Mn: not greater than 1.5%

Cu: 0.3% to 2%; and

W: 1.5% to 3.5%.

3. A welded steel structure as described in claim 1, wherein the chemical composition of the base metal contains:

C: 0.001% to 0.01%

Mn: not greater than 0.5%

Cr: 11% to 14%

Mo: 1.5% to 4%

Ti: 0.01% to 0.2% and wherein the chemical composition of the weld metal contains 2.5% to 5% of Mo.

4. A welded steel structure as described in claim 1, wherein the chemical composition of the base metal contains:

C: 0.001% to 0.01%

Mn: not greater than 0.5%

Cr: 11% to 14%

Mo: 1.5% to 4%

Ti: 0.01% to 0.2% and wherein the chemical composition of the weld metal contains:

Mn: not greater than 1.5%

Cu: 0.3% to 2%; and

W: 1.5% to 3.5%.

* * * * *